United States Patent Office 3,440,141
Patented Apr. 22, 1969

3,440,141
PRODUCTION OF AMINO ACIDS BY THE
FERMENTATION OF $C_{15}$–$C_{22}$ OLEFINS
John D. Douros, Jr., Millington, and Lars A. Naslund,
Roselle Park, N.J., assignors to Esso Research and
Engineering Company, a corporation of Delaware
No Drawing. Filed May 25, 1966, Ser. No. 552,726
Int. Cl. C12d 13/06
U.S. Cl. 195—28                                    5 Claims The present invention is concerned with an improved process for the production of extracellular amino acids. The invention more particularly relates to the production of extracellular amino acids in a fermentation process utilizing hydrocarbons. In accordance with the present invention, high yields of high quality extracellular amino acids are secured by utilizing a particular hydrocarbon fraction in conjunction with an organism. The fraction utilized is a hydrocarbon fraction high in olefins wherein the olefins contain from about 15 to 22 carbon atoms, preferably 17 to 19 carbon atoms in the molecule.

Heretofore the microbiological production of extracellular amino acids such as Lysine, Glutamic and the like has required the use of expensive substrates and precursors which had to be added to the fermentation broth. Moreover, the yields in the majority of extracellular amino acids obtained by processes known in the art have been very poor and the rate of accumulation of product very slow. Therefore one object of the present invention is to provide a process for the production of extracellular amino acids utilizing a particular, inexpensive substrate which microorganisms will readily convert to amino acids in good yield.

It is known in the art to biologically synthesize food protein utilizing a cultivating microorganism and a petroleum substrate. The synthesis is usually conducted in an aqueous biosynthesis bath containing a hydrocarbon feed, an inoculant of the microorganism to be grown, an aqueous growth medium, oxygen and other indispensable nutrients. This technique allows the use of hydrocarbon feeds, which are less expensive than carbohydrates, and does not usually require expensive growth factors such as vitamins, amino acids, etc., in order to insure proper microorganism cell growth. After the synthesis is complete the protein is separated from the broth by a suitable method. This broth under the conventional techniques of fermentation contains minor quantities of amino acids normally not exceeding 0.5 gram per liter.

In accordance with the present invention very high yields of desirable amino acids are secured utilizing a hydrocarbon substrate very high in olefins wherein the carbon atoms in the olefins are in the range of from about 15 to 22 carbon atoms, preferably about 17 to 19 carbon atoms. The nutrient medium employed for the culture of the aforesaid species of this invention to produce amino acids may vary considerably but should contain, in addition to the hydrocarbon substrate as essentially the sole source of carbon, a source of nitrogen and of mineral salts. As pointed out heretofore, the hydrocarbon substrate is preferably an olefin fraction having from about 17 to 19 carbon atoms in the molecule.

The hydrocarbon fraction used should be in excess of about 95%, preferably above about 98% to 100% of olefins. The quantity of olefin hydrocarbon fraction utilized is to secure an olefin concentration in the broth in the range from about 0.1 to 30% by weight, preferably about 1.0 to 4.0% by weight as, for example, 2% by weight.

It is known in the art to use various biological catalysts in fermentation processes. Thus, the biosynthetic process of the present invention is applicable to the biosynthesis of all microorganisms, including bacteria and yeasts, capable of growth on $C_{15}$ to $C_{22}$ olefin hydrocarbon feeds. While the present invention is applicable to a broad scope of operable microorganisms, there are nine microorganisms which are especially suitable for hydrocarbon assimilation. These microorganisms are tabulated hereinbelow along with their corresponding A.T.C.C. registration numbers, which are secured by depositing samples with the American Type Culture Collection in Washington, D.C.

| Microorganism name: | A.T.C.C. number |
|---|---|
| Micrococcus cerificans | 14987 |
| Pseudomonas ligustri | 15522 |
| Pseudomonas pseudomallei | 15523 |
| Pseudomonas orvilla | 15524 |
| Alcaligenes sp. | 15525 |
| Cellumonas galba | 15526 |
| Brevibacterium insectiphilium | 15528 |
| Corynebacterium sp. | 15529 |
| Corynebacterium pourometabolum | 15530 |

However, very desirable organisms for use in the present process are the following:

| | |
|---|---|
| Aspergillus flavus | 9170 |
| Brevibacterium incertum | 8363 |
| Micrococcus rosens | 178 |
| Nocardia erythropolis | 4277 |
| Pseudomonas riboflavina | 9526 |

Certain properties of these organisms are as follows:

Closely resembles strain of *Aspergillus flavus*; rapidly spreading colonies—yellow to yellowish green to brownish green with age; stalks loosely radiated and columnar; vesicles dome shaped, condida pear shaped and rough; and source—isolated from soil.

Closely resembles strain of *Brevibacterium incertum*; gram variable short rods approx. 1.5 microns, nonmotile; gelatin—no liquefaction; nutrient agar—tiny, grayish white poor growth; broth—slight growth; litmus milk—no change; indole—not produced; $H_2S$—not produced; glucose—acid, no gas; sucrose—acid, no gas; maltose—acid, no gas; nitrites not produced from nitrates; and source—isolated from soil.

Closely resembles strain of *Micrococcus rosens*; gram variable coccus, nonmotile ~1.5 microns in diameter; agar colonies: circular, entice, pink; broth: same turbidity, pink sediment; mannitol—acid; produces nitrites from nitrates; utilizes $NH_4H_2PO_4$ as nitrogen source; and source—isolated from soil.

Closely resembles strain of *Nocardia erythropolis*; long filamentous gram positive not acid fast; gelatin—no liquefaction line of puncture filiform, erose; agar colonies—round, 2–3 mm. in diameter, watery white; broth—slight growth; litmus milk—no reaction but rose pellicle; glucose—no acid; lactose—no acid; sucrose—no acid; nitrates—not produced; and source—isolated from soil.

Closely resembles strain of *Pseudomonas riboflavina*; motile thin gram negative rod; gelatin—no liquefaction; yeast-extract glucose broth—viscid; litmus milk—slow peptonization; nitrites produced from nitrates; MRVP—negative; mannitol—no acid or gas; sucrose—no acid or gas; lactose—no acid or gas; maltose—no acid or gas; urea—not used; starch—not hydrolyzed; and source—isolated from soil.

Oxygen is supplied to the cultivation medium in any form capable of being assimilated readily by the inoculant microorganism. Oxygen-containing compounds can be used as long as they do not adversely affect microorganism cell growth and conversion of hydrocarbon feed to microorganism cells. Conveniently, oxygen is supplied as an oxygen-containing gas, e.g., air, which contains between about 19 and about 22 weight percent oxygen. While it is preferable to employ air, oxygen-enriched air having more than 22 weight percent oxygen can be used. In general, between about 0.1 and about 10, preferably between about 0.8 and about 2.5, volumes per minute of air are supplied to the reactor per volume of biosynthesis bath liquid present.

Nitrogen is essential to biological growth. The source of nitrogen can be any organic or inorganic nitrogen-containing compound which is capable of releasing nitrogen in a form suitable for metabolic utilization by the growing microorganisms. In the organic category, the following compounds can be listed as exemplary nitrogen-containing compounds which can be used: proteins, acid-hydrolyzed proteins, enzyme-digested proteins, amino acid, yeast extract, asparagine, urea, etc. For reasons of economy, it is usually preferable to employ an inorganic compound such as ammonia, ammonium hydroxide, or salts thereof such as ammonium phosphate, ammonium citrate, ammonium sulfate, ammonium acid phosphate, etc. A very convenient and satisfactory method of supplying nitrogen is to employ ammonium hydroxide, ammonium phosphate or ammonium acid phosphate, which can be added as the salt per se or can be produced in situ in the aqueous fermentation media by bubbling ammonia gas or gaseous ammonia through the broth to which phosphoric acid was previously added, thereby forming ammonium acid phosphate.

In addition to the energy and nitrogen sources, it is necessary to supply requisite amounts of selected mineral nutrients in the feed medium in order to insure proper microorganism growth and maximize selectivity, viz., the assimilation of hydrocarbons by microorganism cells. Thus, potassium, sodium, iron, magnesium, calcium, manganese, phosphorous, and other nutrients are included in the aqueous growth medium. These necessary materials can be supplied in the form of their salts, and preferably their water-soluble salts. For example, the potassium can be supplied as potassium chloride, phosphate, sulfate, citrate, acetate, nitrate, etc. Iron and phosphorus can be supplied in the form of sulfates and phosphates, respectively, e.g., iron sulfate, iron phosphate. Usually, most of the phosphorus is supplied as ammonium phosphates.

In order to further illustrate the invention, the five organisms decribed heretofore were used in a fermentation process as described. The broth was separated from the cells and the amino acids separated from the broth as follows:

The bacterial cells and other impurities were removed by centrifugation and the amount of each amino acid present in the broth was determined by the following microbiological assay methods. One such series of assay methods is described in the second edition of "Microbiological Assay of the Vitamin B-Complex and Amino Acids," (1952), by E. C. Barton Wright, Pitman Publishing Co., New York, N.Y. Another assay method is the Technicon Amino Acid Analyzer.

The results are illustrated in the following table:

TABLE I.—FIVE ORGANISMS (BACTERIA, ACTINOMYCETES, MOLDS) GROWN ON MINERAL SALTS MEDIA WITH $C_{17}$ TO $C_{19}$ α OLEFINS BEING THE SOLE SOURCE OF C PRODUCED LARGE AMOUNTS OF EXTRACELLULAR AMINO ACIDS

| Organism | Total extra-cellular amino acids, g./l. | Singular amino acids of interest, mg./l. |
|---|---|---|
| Micrococcus rosens | 2.168 | Lysine 782. |
| Nocardia erythropolis | 3.023 | Lysine 619, Glutamic 329. |
| Pseudomonas riboflavina | 3.92 | Lysine 743, Glutamic 444. |
| Aspergillus flavus | 2.74 | Arginine 505. |
| Brevibacterium incertum | 2.927 | Arginine 532. |

From the above it is apparent that unexpected, high yields of high quality amino acids were secured by the process of the present invention.

What is claimed is:

1. Fermentation process for the production of extracellular amino acids which comprises utilizing a hydrocarbon fraction containing in excess of 95% of olefins and wherein said olefins contain from about 15 to 22 carbon atoms in the molecule in a broth comprising an aqueous inorganic salt growth medium, an oxygen-containing gas, a bacteria microorganism capable of growth on said olefin fraction under fermentation conditions adapted to promote growth whereby a high yield of extracellular amino acids is secured.

2. Process as defined by claim 1 wherein the concentration of the olefins in said hydrocarbon fraction is in the range from about 98% to 100%.

3. Process as defined by claim 1 wherein the concentration of the olefins in the broth is in the range of from 0.1 to about 30% by weight.

4. Process as defined by claim 3 wherein the concentration of the olefins in the broth is in the range from about 1.0 to about 4.0% by weight.

5. Process as defined by claim 1 wherein said microorganism is selected from the class consisting of *Aspergillus flavus*, *Brevibacterium incertum*, *Micrococcus rosens*, *Nocardia erythropolis* and *Pseudomonas riboflavina*.

References Cited

UNITED STATES PATENTS 3,222,258   12/1965   Iizuka et al. _____ 195—29

LIONEL M. SHAPIRO, *Primary Examiner.*